United States Patent [19]

Wiemeri et al.

[11] Patent Number: 4,921,024
[45] Date of Patent: May 1, 1990

[54] METHOD AND APPARATUS TO FELL A TREE

[75] Inventors: Ronald W. Wiemeri, Owatonna, Minn.; James N. Mitchell, Skippers, Va.

[73] Assignee: Blount, Inc., Montgomery, Ala.

[21] Appl. No.: 422,137

[22] Filed: Oct. 16, 1989

[51] Int. Cl.⁵ .................................. A01G 23/08
[52] U.S. Cl. ..................... 144/336; 83/544; 83/835; 83/860; 83/928; 144/3 D; 144/34 R; 144/251 R
[58] Field of Search ............. 83/544, 860, 835, 928; 144/3 D, 34 R, 251 R, 336

[56] References Cited

U.S. PATENT DOCUMENTS

| | | |
|---|---|---|
| Re. 29,235 | 5/1977 | Kurelek . |
| 3,238,981 | 3/1966 | Larson et al. . |
| 3,363,929 | 1/1968 | Nelson . |
| 3,371,692 | 3/1968 | Larson et al. . |
| 3,631,995 | 1/1972 | Jones et al. . |
| 3,749,143 | 7/1973 | Hamilton . |
| 3,795,264 | 3/1974 | Coughran, Jr. . |
| 3,805,860 | 4/1974 | Smith . |
| 3,911,981 | 10/1975 | Tucek . |
| 4,270,586 | 6/1981 | Hyde et al. ............... 144/34 R |
| 4,446,897 | 5/1984 | Kurelek .................. 144/34 R |

*Primary Examiner*—W. Donald Bray
*Attorney, Agent, or Firm*—Klarquist, Sparkman, Campbell, Leigh & Whinston

[57] ABSTRACT

A method and apparatus to fell a tree is disclosed. A vehicle mountable felling head includes a circular saw mounted to the felling head. A guard overlays the circular saw as a safety measure. The guard has a first portion which is fixed. The fixed portion of the guard has an opening exposing a first arcuate portion of the saw. The guard also has a second, movable portion which overlays a second arcuate portion of the circular saw. The second portion of the guard may be raised to expose a second arcuate portion of the circular saw to cut a slot in one side of a tree with the cut being completed by the first arcuate portion thereby allowing a tree greater in diameter than the radius of the circular saw to be severed.

7 Claims, 4 Drawing Sheets

METHOD AND APPARATUS TO FELL A TREE

TECHNICAL FIELD

This invention relates to a method and apparatus to sever a standing tree from its base, specifically the invention relates to a circular saw and a saw guard mounted on a vehicle to sever a tree by advancing the saw toward the tree.

BACKGROUND OF THE INVENTION

Many devices have been developed for felling trees. Some of these devices have been incorporated into self propelled mechanisms by mounting the felling head on a vehicle. The one thing all of the machines have in common is that a mechanism is provided to sever the tree from its base. Large shears, reciprocating saw blades, various configurations of chain saw blades and circular saws all have been used with some success.

Generally the devices which use circular saws have a guard or housing about the circular saw blade to protect the operator and other personnel from the saw blade. An opening is usually provided in the front portion of the guard to expose a portion of the saw blade for cutting the tree. This arrangement, however, limits the diameter of the tree which can be cut. One method to cut oversize trees was to partially cut the front side of a tree, drive the felling apparatus to the back of the tree and complete the severing from the backside of the tree. This method is time consuming and often is not practical because of the density of most woodlots.

Kurelek, U.S. Pat. No. 4,446,897, recognized the mobility problem and mounted the circular saw and felling head on a boom which is attached to a vehicle. Kurelek also placed a second opening in the saw guard to allow the saw blade to cut on either side. The Kurelek apparatus was thus able to cut in a straight ahead mode or in a side-swing or scything mode. Although an improvement over the prior art the Kurelek patent has the disadvantage of leaving the second portion of the saw blade exposed and unprotected. Kurelek also does not address the problem of felling an oversize tree.

The present invention thus overcomes the limitations and problems in the prior art.

DISCLOSURE OF THE INVENTION

The present invention includes a felling head mounted on a vehicle. The felling head includes a frame having an upper portion and a lower portion. A bunching arm is attached to the upper portion of the frame and a circular saw is supported by the lower portion of the frame. A guard overlays the circular saw. The guard has a first or fixed portion attached to the frame and a second or movable portion hinged to the first portion.

A means to move the second portion of the guard has its first end attached to the frame and its second end attached to the second portion of the guard. An opening is provided in the fixed portion of the guard to expose a first arcuate portion of the circular saw. The second portion of the guard, when raised, exposes a second arcuate portion of the circular saw.

To sever a large tree, the guard is raised and the second arcuate portion of the circular saw is advanced in a first direction to cut a first side of the tree. The vehicle is reversed, bringing the circular saw out of engagement with the tree. The vehicle is then advanced in a second direction which is at an angle to the first direction bringing the first arcuate portion of the saw into cutting engagement with the second side of the tree to completely sever the tree.

It is an object of the invention to provide a mobile apparatus to fell a tree, the apparatus having a circular saw mounted thereon which can fell a tree larger in diameter than the radius of the saw.

It is a further object of the invention to provide a guard about the circular saw, the guard having a movable portion which can selectively either expose or overlay a portion of the circular saw.

Other objects and advantages of the present invention will be apparent from the following description of a preferred embodiment thereof and from the attached drawings.

BRIEF DESCRIPTION OF THE DRAWINGS

FIG. 7 is a top view of the fixed guard, the moveable guard and the circular saw of the present invention showing the direction of travel of the circular saw in making a final cut on an over-size tree.

DETAILED DESCRIPTION OF THE INVENTION

Figure 1:
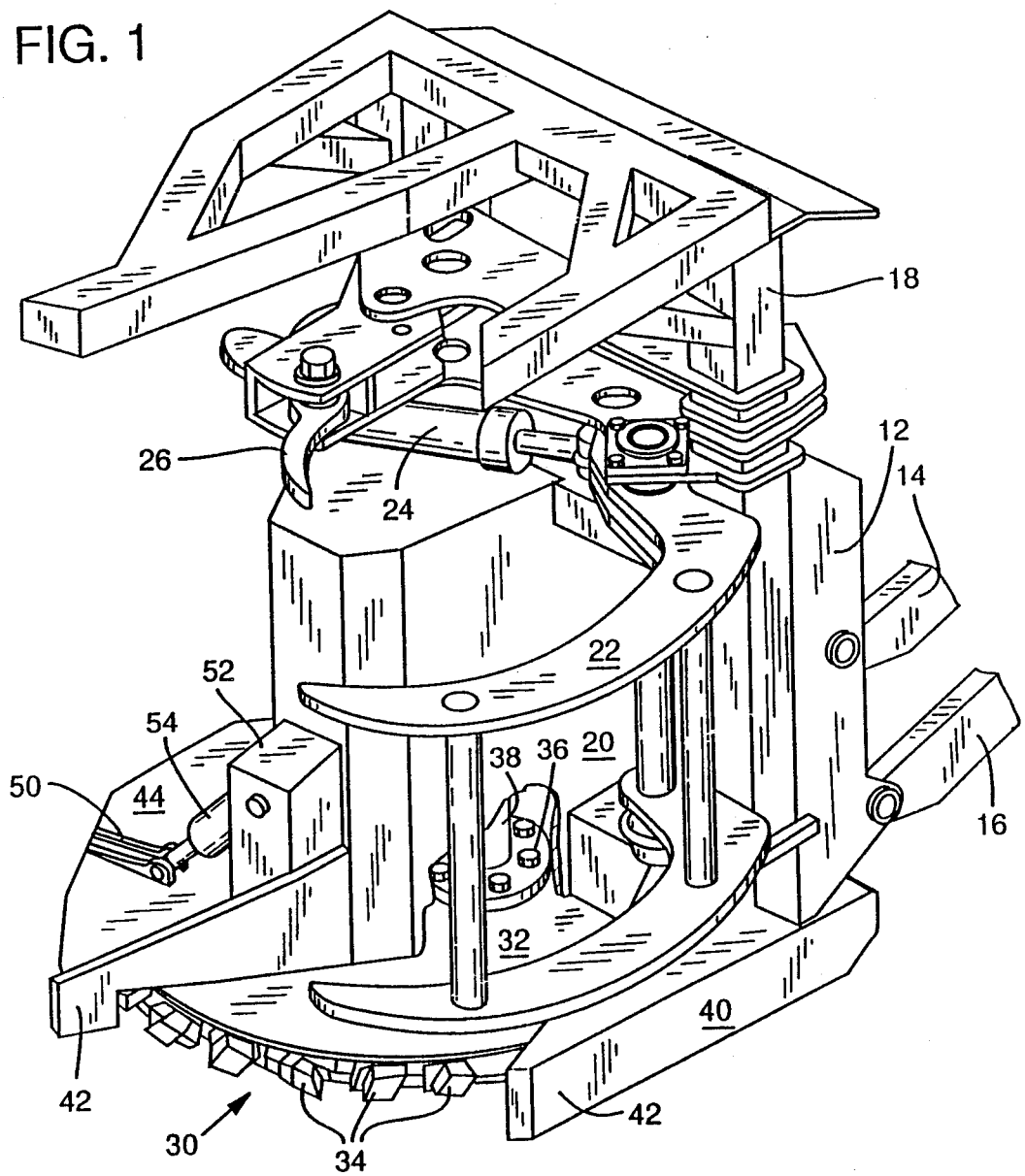
FIG. 1 is a perspective view of the felling head of the present invention.

Referring to FIG. 1, the saw arrangement of the invention is illustrated mounted on a feller buncher type of felling apparatus and which apparatus includes a frame 12 supported from a vehicle 13 (shown in FIG. 5) by suitable means including arms 14 and 16. The vehicle may be a tired vehicle or a tracked vehicle as is known in the art. The frame 12 has an upper portion 18 and a lower portion 20. A pair of gathering arms 22 are attached to the upper portion of the frame 18 for gathering small diameter trees as they are severed by the felling head. The gathering arms 22 are activated by a hydraulic cylinder 24 having a first end attached to the upper frame 18 and a second end attached to the arm 22. Extending the hydraulic cylinder 24 forces the arms 22 in toward the felling head and retracting the hydraulic cylinder 24 rotates the arms out, away from the felling head. A bunching arm 26 is pivotably attached to the upper frame 18 to assist in holding a severed tree against the upper frame 18 after it was gathered by gathering of arms 22. An additional hydraulic cylinder (not shown) is used to activate arm 26.

Figure 2:
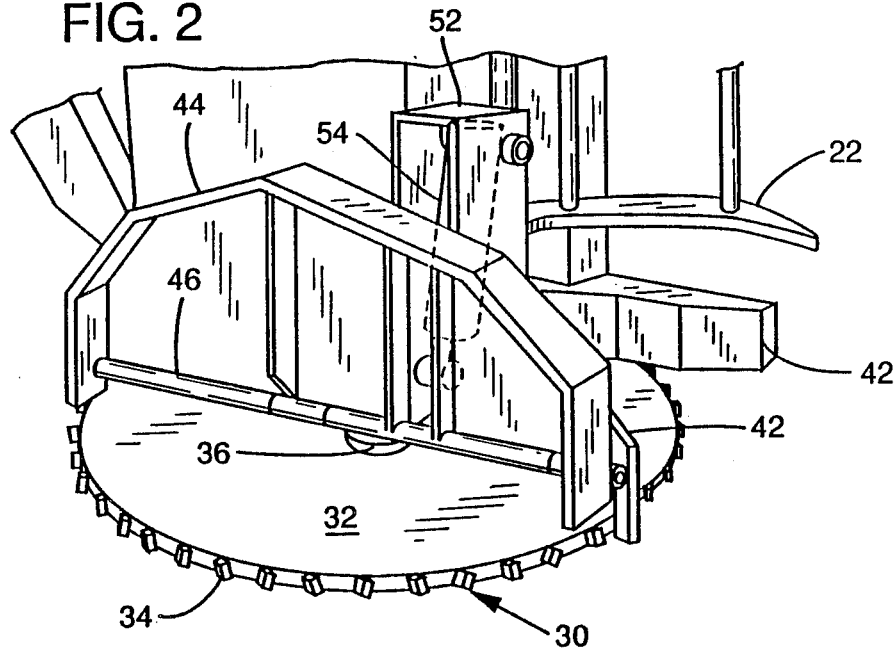
FIG. 2 is a perspective side view of a felling head of the present invention showing the movable guard in an upright position.
Figure 3:
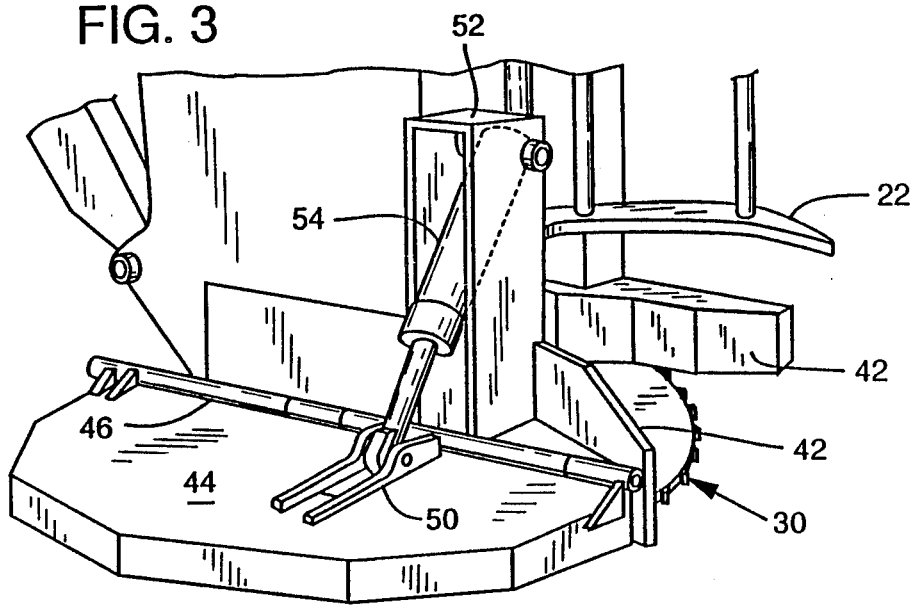
FIG. 3 is a perspective side view of the felling head of the present invention showing the movable guard in a lowered position.

With reference now to FIGS. 1–3, a circular saw assembly 30 is mounted on the lower frame 20. The circular saw assembly 30 comprises a disk 32 on the periphery of which teeth 34 are provided by forming them integrally or by securing thereto a plurality of formed teeth. The disk 32 is attached to a hub 36 suitably secured to the end of a vertical shaft 38 driven by a suitable motor (not shown) mounted within the lower portion 20 of the frame. In the preferred embodiment of the invention, disk 32 is approximately fifty-four inches in diameter. The cutting teeth 34 extend beyond this perimeter to present a fifty-seven inch cutting diameter.

Attached to the lower frame 20 is a saw guard 40 having a fixed portion 42 fixedly attached to the lower frame 20. A movable guard portion 44 is suitably attached to the fixed portion of the guard 42 by a hinge 46. Means are provided to raise and lower the guard portion 44 between a covered position as shown in FIGS. 1 and 3 and a raised position as shown in FIG. 2. The illustrated means includes a bracket 50 provided on the movable portion of the guard 44. A second bracket 52 is provided on the lower portion of the frame 20. A hydraulic cylinder 54 is interconnected between bracket 50 and bracket 52 such that the first end of the hydraulic cylinder 54 is connected to the bracket 52 which is part of frame 12 and the second end of the hydraulic cylinder 54 is attached to bracket 50 which is part of the second or movable portion of the guard 44.

Referring now to FIG. 2 and FIG. 3, a better representation of the movable portion 44 of the guard may be seen. In FIG. 2 the hydraulic cylinder 54 has been retracted, raising the movable portion of the guard 44. In FIG. 3 the hydraulic cylinder 54 has been extended, thereby lowering the movable guard 44 over the circular saw assembly 30.

Figure 4:
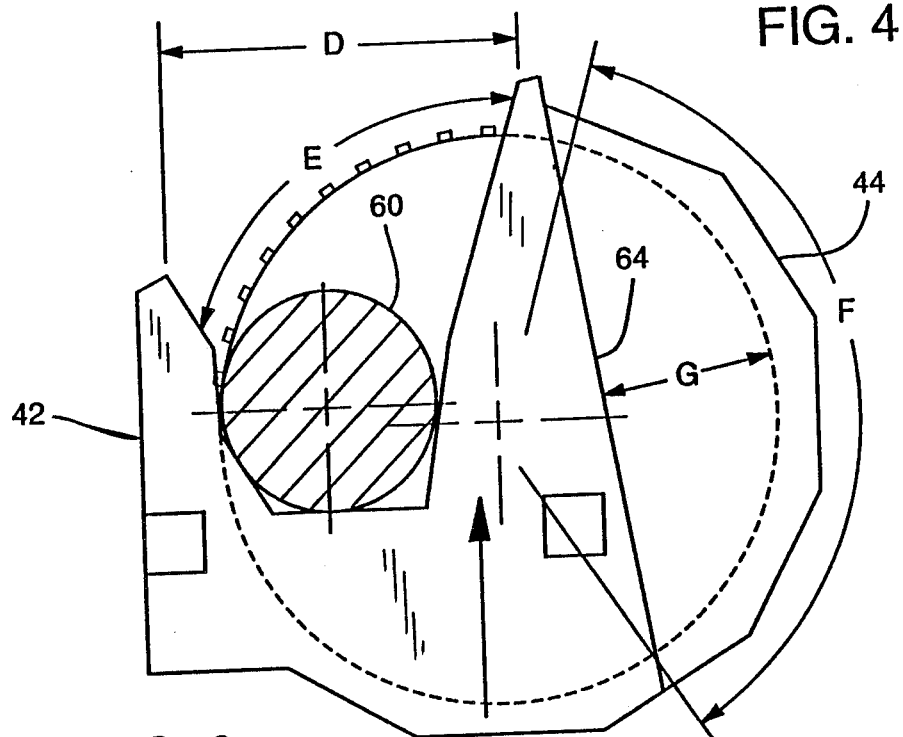
FIG. 4 is a top view of the circular saw as it engages a tree of small diameter.

Referring now to FIG. 4, the fixed portion of the guard 42 and the movable portion of the guard 44 can be seen in the top view. The fixed portion of the guard 42 has an opening labeled "D" for the felling of normal-size trees. Opening "D" exposes a first arcuate surface "E" of the circular saw 20 for cutting a tree 60. The tree 60 in the illustration is twenty-two inches in diameter and is the maximum diameter tree which can be cut by merely cutting with the first arcuate portion "E". To sever the tree 60, the vehicle supporting the saw apparatus is advanced in a substantially straight path, denoted by the arrow A, aligned so that the tree will enter the rear portion 62 of the opening "D," as shown in FIG. 4 as the saw 30 passes through the tree.

The center line of the hinge 46 of the movable portion of the guard 44 can be seen as line 64 in FIG. 4. When the movable guard is raised, as was shown in FIG. 2, a second arcuate portion "F" of the circular saw 30 is exposed for cutting. The second arcuate portion "F" of the circular saw 30 includes a leading edge away from the vehicle and a trailing edge toward the vehicle for cutting. In the illustrated embodiment, the maximum spacing from the saw periphery to the hinge 46 a long the line "G" is approximately eighteen inches. Thus, a straight-ahead cut along the center line of the hinge line 64 can place a cut eighteen inches wide into the side of a tree.

Figure 5:
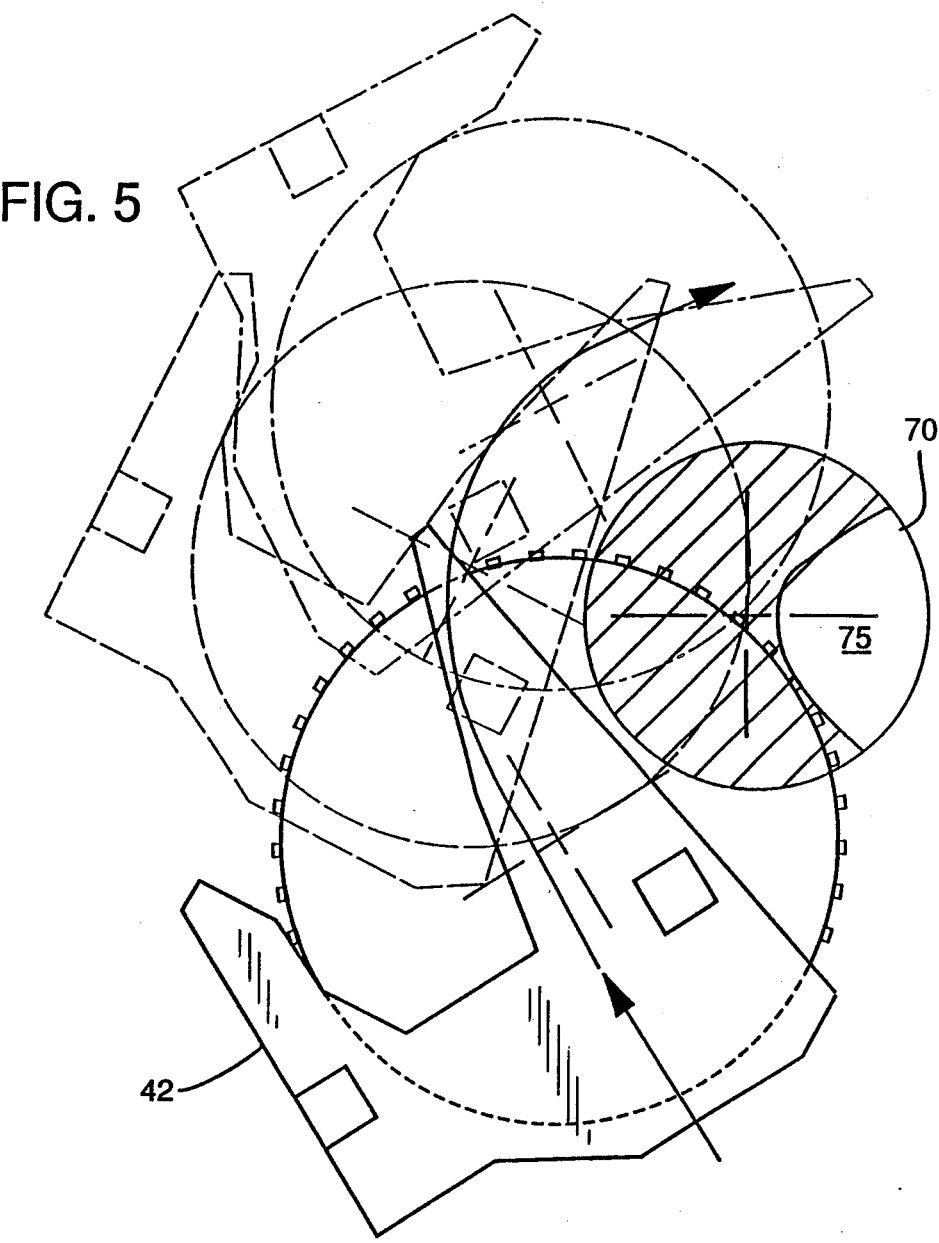
FIG. 5 is a top view of the apparatus of the present invention showing the first and second direction of travel used to cut an over-size tree.

Referring now to FIG. 5, it can be seen how the felling head of the present invention may sever an oversize tree without the necessity of moving the vehicle 13 180 degrees around to the back side of the tree. The vehicle 13 is advanced toward the tree 70 along a first direction denoted by the arrow B. The movable guard 44 has been raised exposing the circular saw 30. As vehicle 13 is advanced along arrow B, tree 70 is cut leaving an uncut portion 75. Vehicle 13 is reversed and translated to position it to advance toward tree 70 along a second direction denoted by arrow C. The first arcuate portion E of circular saw 30 completes cutting portion 75 thereby severing the tree. The angle between the first direction of advance, arrow B and the second direction of advance, arrow C, is an acute angle Φ.

Figure 6:
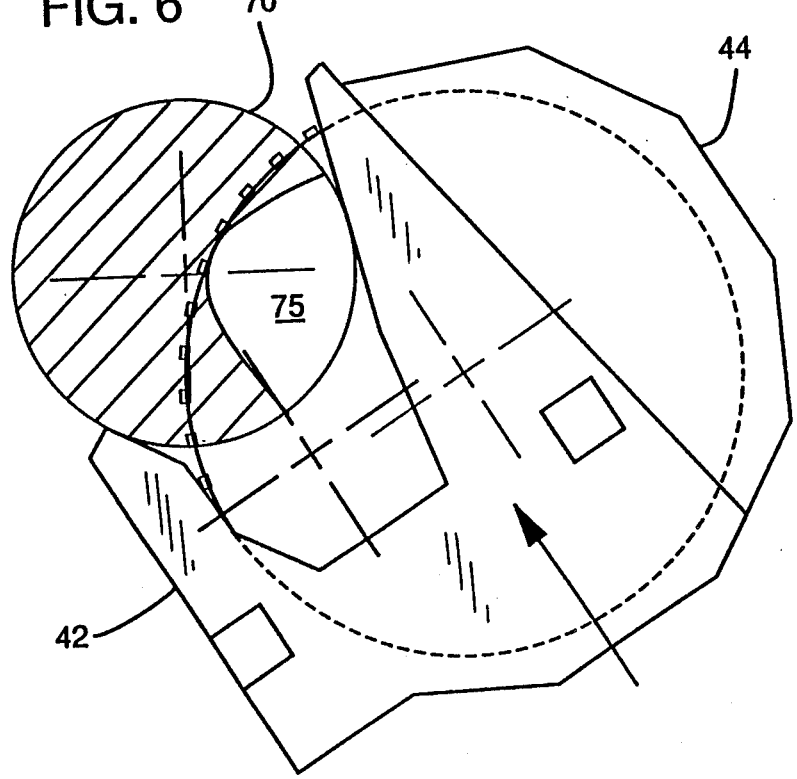
FIG. 6 is a top view of the fixed guard and the circular saw of the present invention showing the travel of the circular saw in making a first cut of an over-size tree.

Referring now to FIG. 6, it can be seen how the movable portion of the guard 44 may be raised and the vehicle advanced toward a tree 70 approximately thirty-six inches in diameter. In this manner, approximately one-half or more of the cross section of the tree can be cut leaving an uncut portion 75 of tree 70. Thereafter, the vehicle is reversed and the saw is taken out of engagement with the tree. Movable guard 44 is lowered and the vehicle is advanced toward the tree, as shown in FIG. 7, approximately an angle of Φ to the initial cut shown in FIG. 6. In this manner, the first arcuate portion "E" of the circular saw cuts the remaining portion 75 of the tree 70. In this manner a bunching saw assembly nominally designed to cut twenty-two inch diameter trees may be used to fell thirty-six inch diameter trees.

OPERATION

In normal operation the felling head of the bunching saw is advanced toward a tree by the vehicle. Movable guard 44 is down over the circular saw as a safety measure. The circular saw is rotated as the vehicle is advanced directing the tree into the opening "D" of the fixed portion 42 of the guard. The exposed first arcuate portion "E" of the circular saw 30 cuts the tree. As the trees are severed, the arms 22 and 26 are activated to captivate the tree between the grappling arms and the frame 12. The vehicle is reversed and the tree released in an area away from the felling work. When severing small trees, a number of them can be gathered within the arm 22 bunched with arm 26 and released and piled as a bunch at a desired location.

When an oversize tree is encountered, that is a tree over twenty-two inches in diameter, the movable portion 44 of the guard is raised exposing the second arcuate portion "F" of the circular saw 30. The vehicle is advanced in a first direction cutting a first side of the tree with the second arcuate portion "F" of the circular saw. The vehicle is then reversed, disengaging the saw from the tree and the movable portion 44 of the guard is lowered to cover the second arcuate portion of the saw. The vehicle is translated sideways and then advanced in a second direction generally at an angle Φ to the first direction toward the second side of the tree to cut the remaining portion of the tree with the first arcuate portion "E" of the circular saw. The vehicle continues to advance so as to push or forward tilt the severed tree over and permit it to fall to the ground.

Of course, it should be understood that a wide range of changes and modifications can be made in the preferred embodiment described above. It is therefore intended that the foregoing description be regarded illustrative rather than limiting, and that it is understood that it is the following claims, including all equivalents, which are intended to define the scope of the invention.

I claim:

1. A saw assembly used in conjunction with a vehicle mounted felling head, the saw assembly comprising:
   (a) a horizontally orientated circular saw blade;
   (b) a guard having a first side and a second side said guard mounted above the saw blade and extending down about the periphery of the saw blade;

(c) an opening in the first side of said guard, said opening exposing an arcuate portion of the saw blade as a first cutting portion;
(d) a hinge attaching the fixed first side of the guard to the second side of the guard; and
(e) a means to pivot said second side of said guard about said hinge up away from said saw blade to expose a second cutting portion of said saw blade.

2. A bunching saw assembly for mounting on a vehicle comprising:
(a) a frame;
(b) a horizontally orientated circular saw blade supported by said frame;
(c) a guard having a first side and a second side, said first side of said guard rigidly mounted to said frame above the saw blade;
(d) a hinge pivotably connecting the second side of the guard to the first side of the guard; and
(e) a means to pivot the second side of the guard about the hinge to expose a portion of the saw blade for cutting.

3. A bunching saw assembly for mounting on a vehicle comprising:
(a) an upper and a lower part;
(b) the upper part including a frame adapted to contact a tree being felled;
(c) the lower part including a circular saw blade supported by said frame, said saw blade rotatable in a generally horizontal plane;
(d) a guard having a first side and a second side, said guard lying above said saw blade and extending down about the periphery of said saw blade;
(e) the first side of said guard rigidly attached to the frame;
(f) the first side of said guard having an opening exposing a first arcuate portion of said saw blade for cutting a tree;
(g) a hinge interconnecting the first side of said guard and the second side of said guard; and
(h) a means to pivot the second side of said guard about said hinge to expose a second arcuate portion of said saw blade for cutting a tree.

4. An apparatus adapted for mounting on a vehicle for felling trees comprising;
(a) a felling head adapted to be attached to a vehicle;
(b) the felling head having a frame with an upper portion and a lower portion;
(c) a circular saw supported by the lower portion of the frame;
(d) the circular saw rotatable in a horizontal plane;
(e) the circular saw having a leading edge away from said vehicle and a trailing edge toward said vehicle;
(f) a guard overlying said circular saw, said guard having a fixed portion and a movable portion;
(g) the fixed portion of the guard being attached to the lower portion of the frame and overlaying a first side of the circular saw;
(h) an opening in the fixed portion of the guard to expose an arcuate portion of the leading edge of the first side of the circular saw;
(i) the movable portion of the guard being pivotably attached to the fixed portion of the guard and overlying a second side of the circular saw; and
(j) a means to move the movable portion of the guard to expose an arcuate portion of the second side of the circular saw including a portion of the leading edge and a portion of the trailing edge of the circular saw, wherein by propelling the vehicle toward a first side of the tree, exposing the arcuate portion of the second side of the circular saw and cutting the first side of the tree and thereafter translating the vehicle, covering the second side of the circular saw with the movable portion of the guard, and advancing the vehicle toward a second side of the tree and cutting the remaining portion of the tree with the first arcuate portion of the circular saw, to completely sever the tree.

5. An apparatus adapted for mounting on a vehicle for felling trees comprising;
(a) a frame adapted to be attached to a vehicle, said frame having an upper portion and a lower portion;
(b) a means for engaging a tree on the upper portion of the frame;
(c) a circular saw supported in a horizontal plane by the lower portion of the frame;
(d) a guard above the saw, said guard having a first portion and a second portion;
(e) the first portion of the guard being attached to the frame overlying a first side of the circular saw, said first portion of the guard having an opening in the front thereof to expose a first arcuate portion of the circular saw for cutting a standing tree;
(f) the second portion of the guard being pivotably attached to the first portion of the guard, said second portion of the guard overlying a second side of the circular saw; and
(g) a means to pivot the second portion of the guard, up away from the circular saw to expose a second arcuate portion of the circular saw for cutting and a means to lower the second portion of the guard to overlay the second arcuate portion of the circular saw when said second arcuate portion of the circular saw is not cutting.

6. A method to fell a tree comprising the steps of:
attaching to a vehicle a felling head having a circular saw rotatable in a horizontal plane;
overlaying said circular saw with a saw guard having a first portion and a second portion, the guard having an opening in the first portion of the guard to expose a first arcuate cutting portion of said saw and a second portion pivotably attached to the first portion of the guard to selectively cover or uncover a second arcuate cutting portion of said saw;
raising said second guard portion and advancing the vehicle and the felling head toward a first side of a tree to allow the second arcuate cutting portion of the saw to cut a first slot through the first side of the tree;
reversing the vehicle and the felling head to disengage the saw from the first side of the tree;
covering the second arcuate cutting portion of the saw with the second portion of the guard;
advancing the vehicle and the felling head toward the tree opposite said first side such that the first arcuate cutting surface of the saw engages said opposite side of the tree to cut a slot through the second side of the tree intersecting the first slot in the first side of the tree thereby severing the tree.

7. A method to fell a tree comprising the steps of:
mounting a circular saw in a horizontal plane on a vehicle, said circular saw having a first arcuate cutting portion and a second arcuate cutting portion overlaid by a movable guard;
moving the movable guard to uncover the second arcuate portion of the circular saw;

advancing the vehicle and the circular saw toward a first side of a tree in a first direction to cut the first side of the tree with the second arcuate portion of the circular saw;

reversing the vehicle and the circular saw along the first direction to disengage the circular saw from the tree;

moving the movable guard to cover the second arcuate cutting portion of the circular saw;

advancing the vehicle and the circular saw toward a second side of the tree in a second direction, said second direction being at an acute angle to said first direction, to cut the remaining portion of the tree on the second side with the first arcuate portion of the circular saw.

* * * * *